July 3, 1951 H. A. RIKE 2,559,372

THERMOSTATIC SWITCH

Filed Dec. 10, 1948

HOWARD A. RIKE
INVENTOR.

BY Cecil L. Wood

ATTORNEY

Patented July 3, 1951 2,559,372

UNITED STATES PATENT OFFICE 2,559,372

THERMOSTATIC SWITCH

Howard A. Rike, Los Angeles, Calif.

Application December 10, 1948, Serial No. 64,663

2 Claims. (Cl. 200—137)

This invention relates to fire alarm systems, and it has particular reference to a thermo-sensitive device adapted to be installed in an alarm circuit, such as a telephone circuit, or the like, and its principal object resides in the provision of a highly sensitive thermally responsive actuator for such circuits, capable of being installed therein with a minimum of difficulty and expense and afford an effective means for energizing the circuits at only slight variations in temperatures.

An object of the invention is that of providing an adjustable switch actuator, capable of reacting instantly to any temperatures slightly above normal for its location, and affording a device which can be installed economically in multiples and in remotely situated locations, as in hotels, warehouses, stables, and the like, in alarm circuits or in already established telephone circuits operating on the premises or from a central exchange board in community circuits.

The invention contemplates the provision of a signal or alarm system especially adapted for connection into a telephone circuit, usually operating on from 24 to 48 volts, and affording a micro-sensitive switch which reacts to variations in temperatures as low as 2 degrees, actuating the telephone circuit to effect a signal at the control panel or exchange board indicating the exact location of a fire almost at its inception.

Broadly the invention involves the provision of a simple arrangement of a thermo-sensitive device which is capable of micromatic adjustments to effect the actuation of the alarm circuit at any desired temperature range, and afford a dependable means for energizing the alarm circuit at predetermined increases in temperatures above normal.

While the foregoing objects are paramount, other and lesser objects will become manifest as the description proceeds, taken in connection with the appended drawings wherein.

Figures 1, 2, 3, 4, 5, 6:
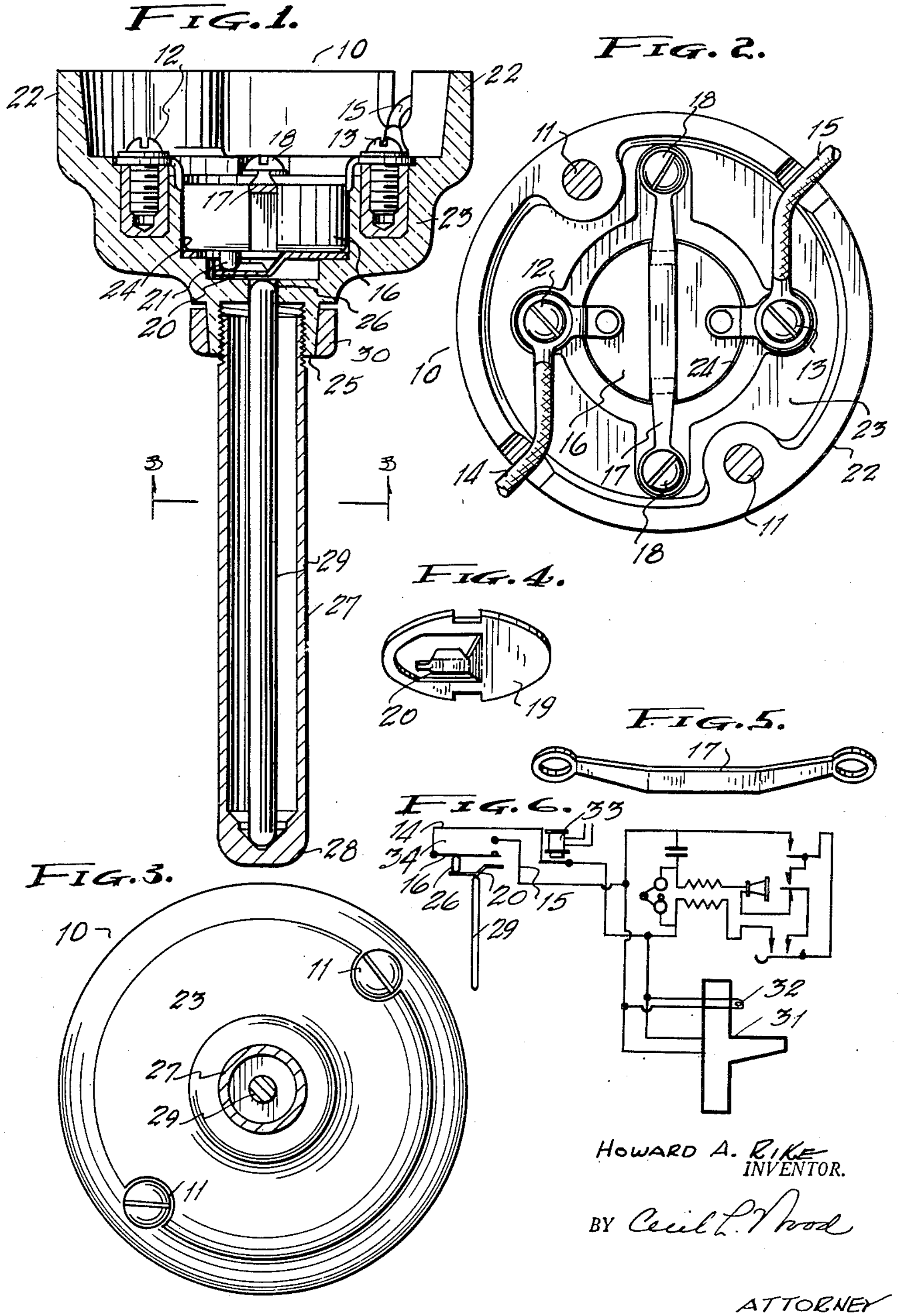
Figure 1 is a longitudinal cross-sectional view of the invention, which is shown enlarged, illustrating the adjustable tube, the base, the switch and switch actuating rod.
Figure 2 is an inverted plan view of the base showing the terminal connections.
Figure 3 is a plan view of the base member and illustrates the tube and switch actuating rod in transverse section on lines 3—3 of Figure 1.
Figure 4 is a perspective view of the switch actuating plate.
Figure 5 illustrates, in perspective, the switch retainer bar.

Figure 6 diagrammatically illustrates a typical telephone circuit in which the invention may be installed.

It is an object of the invention to provide a circuit connector which is so highly sensitive that only a slight change upwardly in the normal temperature for which the device is set will actuate the switch and close the circuit in which the device is installed. Numerous alarm systems have been developed requiring complicated apparatus adapted to respond to changes in temperature but which have not necessarily been micromatically accurate. The invention, therefore, embodies a combination of elements which, by reason of their simplicity, affords an economical and dependable arrangement for actuating an alarm circuit, either opening or closing the same upon variations in temperature, and which can be economically constructed and, by reason of its simplicity and relatively small dimensions, can be installed in remote locations in telephone circuits without interfering with the normal operation of the circuit and without detracting from the appearance of the room in which the same is installed.

Accordingly, therefore, the invention comprises a base member 10 formed of plastic and capable of being secured by screws 11, or the like, to a wall or ceiling in a room and be adapted to extend from the wall or depend from the ceiling, as desired. The base 10 has a pair of terminals 12 and 13 therein to which conductors 14 and 15 can be connected through a switch 16 arranged in the base 10, as apparent particularly in Figure 1. The switch 16 is of the conventional micromatic type and is secured in the base 10 by a retaining bar 17, illustrated in perspective in Figure 5. The retainer bar 17 is secured into the base 10 by screws 18, as apparent in Figure 2.

An actuator plate 19, illustrated in perspective in Figure 4, is arranged in the base 10, as is apparent in Figure 1, and has a tensioned tongue 20 formed therein which is engageable with the actuating plunger 21 of the switch. The base 10 is formed with a flanged portion 22 and a body 23, a recess 24 being formed in the body 23 to receive the switch 16. A substantially reduced neck portion 25 is formed integral with the body 23 and is interiorly threaded, as illustrated in Figure 1, while the exterior thereof is slightly tapered. An aperture 26 is arranged centrally of the recess 24 in the body 23 and communicates through the neck 25.

A tubular housing 27, having its outer end 28 closed, and exteriorly threaded at its opposite end, is threadedly secured within the neck 25 so that it may be longitudinally adjusted with respect to the base 10. A rod 29 is arranged concentrically of the tube 27 and has one end extending through the aperture 26 and is engageable with the tongue 20 of the member 19 to depress the same against the plunger 21 of the switch 16 to actuate the latter. The rod 29 is formed of a metal which is highly sensitive to temperature changes, expanding and contracting longitudinally to the extent where the micromatic switch 16 can be actuated by only a slight change upwardly in temperature, the outer closed end 28 of the tube 27 restraining the rod 29 against expansion outwardly and causing the same to expand inwardly against the tongue 20. In order to regulate the movement of the rod 29 the tube 27 may be adjusted toward or away from the base 10 by threading the same in the neck 25 and locking the tube 27 against rotation by an interiorly tapered collar 30 which is pressed upon the neck 25 in the manner illustrated in Figure 1.

It is contemplated that both the tube 27 and the rod 29 be formed, if desirable, of any materials, preferably metals, which respond quickly to only slight changes in temperature. It is desirable, however, that one or the other of the elements be of such material since it would not be desirable to have both expansible in the same degree since one is intended to limit the other in its movement. It has been found that it is most desirable to employ a rod 29 of a suitably expansible material while the tube 27 may be of aluminum, or other metals or plastics, and serve as a limiting factor for the rod 29 which expands and contracts when subjected to changes in temperature to actuate the switch element 16 to open or close the circuits, according to the manner in which the switch operates and in which it is installed in the circuit.

In Figure 6 is illustrated a conventional telephone circuit. In the circuit illustrated is shown a conventional switch board 31 having a signal 32 thereon by which the operator is apprised of the energization of the circuit. The conventional annunciator and receiver assembly is arranged in the circuit and it will be noted, a relay 33 is provided between the telephone circuit and the alarm circuit 34 which is opened and closed by the operation of the switch plunger 21 through the medium of the tongue 20 of the member 19 and the rod 29. When the circuit 33 is actuated a signal is transmitted to the switchboard 31 such as is ordinarily transmitted to indicate a busy signal of the telephone circuit although the oscillations or the rhythm of such signals are stepped up many times and are somewhat amplified to indicate to the operator at the switchboard 31 that the alarm circuit has been energized.

Manifestly, the structure herein shown and described is capable of considerable modification, by persons skilled in the art, without departing from the spirit and intent of the invention, or the scope of the appended claims.

What is claimed is:

1. In a thermo-sensitive switch for alarm circuits, in combination with a flanged base member formed with a tapered neck portion, a micro-sensitive switch mounted in said base member and having an actuator plate adjacent thereto formed with a tensioned tongue engageable with the operating plunger of said switch, a tubular housing having one end closed and having its open end threaded into the said neck portion and capable of longitudinal adjustment with respect to said base, a thermo-sensitive rod concentrically arranged in said tube whereby its upper end will engage said tensioned tongue to actuate said switch at increased temperatures, and a collar embracing said neck portion locking said tube in adjusted positions.

2. In a thermal-sensitive switch for an alarm circuit, the combination comprising a base member formed with a mounting flange and an externally tapered neck portion, a micro-switch in said base member connected into said circuit and having an actuating plunger, an actuator plate associated with said switch having a tensioned tongue engageable with said plunger, a tubular housing closed at one end and having its open end threaded into said neck portion and capable of longitudinal adjustment with respect to said base member, a thermo-sensitive rod arranged concentrically of said housing having one end engageable with the tongue of said actuator plate to operate the same when expansion occurs under increased temperatures, and a collar on said neck portion securing said tubular housing in adjusted positions.

HOWARD A. RIKE.

REFERENCES CITED

The following references are of record in the file of this patent:

UNITED STATES PATENTS

| Number | Name | Date |
| --- | --- | --- |
| 1,483,787 | Dixon | Feb. 12, 1924 |
| 1,940,300 | Gerdien et al. | Dec. 19, 1933 |
| 2,185,623 | Beam | Jan. 2, 1940 |
| 2,270,738 | Lightfoot | Jan. 20, 1942 |
| 2,439,502 | Tate | Apr. 13, 1948 |